US012711747B2

(12) United States Patent
Ferreira et al.

(10) Patent No.: US 12,711,747 B2
(45) Date of Patent: Aug. 18, 2026

(54) DISTRIBUTED IMAGE DISTILLATION FOR PRIVATE AND EFFICIENT EVENT PREDICTION IN LOGISTICS

(71) Applicant: Dell Products L.P., Round Rock, TX (US)

(72) Inventors: Paulo Abelha Ferreira, Rio de Janeiro (BR); Vinicius Michel Gottin, Rio de Janeiro (BR); Pablo Nascimento da Silva, Niteroi (BR)

(73) Assignee: Dell Products L.P., Round Rock, TX (US)

(*) Notice: Subject to any disclaimer, the term of this patent is extended or adjusted under 35 U.S.C. 154(b) by 876 days.

(21) Appl. No.: 17/661,955

(22) Filed: May 4, 2022

(65) Prior Publication Data

US 2023/0360377 A1 Nov. 9, 2023

(51) Int. Cl.
*G06V 10/776* (2022.01)
*G06V 10/774* (2022.01)
*G06V 20/40* (2022.01)

(52) U.S. Cl.
CPC .......... *G06V 10/776* (2022.01); *G06V 10/774* (2022.01); *G06V 20/44* (2022.01)

(58) Field of Classification Search
CPC ... G06F 18/214; G06F 18/217; G06V 10/774; G06V 10/776; G06V 20/44
See application file for complete search history.

(56) References Cited

U.S. PATENT DOCUMENTS

| | | | | |
|---|---|---|---|---|
| 2019/0013047 | A1* | 1/2019 | Wait | G11B 27/002 |
| 2021/0225463 | A1* | 7/2021 | Knighton, Jr. | G06N 3/045 |
| 2022/0261599 | A1* | 8/2022 | Kastaniotis | G06F 18/2155 |
| 2023/0068386 | A1* | 3/2023 | Akdeniz | G06N 3/084 |
| 2023/0122139 | A1 | 4/2023 | Ferreira et al. | |
| 2023/0289169 | A1* | 9/2023 | Gottin | G06N 20/00 |
| 2024/0086715 | A1* | 3/2024 | Sandberg | G06N 3/092 |

FOREIGN PATENT DOCUMENTS

| | | | |
|---|---|---|---|
| CN | 113791895 | * 12/2021 | G06F 17/16 |

OTHER PUBLICATIONS

T. Wang, J. Zhu, A. Torralba and A. Efros, "Dataset distillation," arXiv, vol. preprint arXiv:1811.10959., 2018.

* cited by examiner

*Primary Examiner* — Zhiyu Lu
(74) *Attorney, Agent, or Firm* — Workman Nydegger

(57) ABSTRACT

One example method includes, in an environment having a first near-edge node and a second near-edge node, each of which is operable to communicate with a respective set of edge nodes and with a central node: instantiating, by the central node, a dataset distillation process, wherein the dataset includes data collected by the edge nodes, and the data remains at the near-edge nodes and is not accessed by the central node; performing the dataset distillation process to create a distilled dataset; pre-training a machine learning model using the distilled dataset; comparing the pre-trained machine learning model to one or more other pre-trained machine learning models; and deploying, to the edge nodes, the pre-trained learning model that has been determined, based on the comparing, to provide the best performance as among the pre-trained machine learning models that have been compared.

18 Claims, 7 Drawing Sheets

100

```
# Dataset Distillation
M: Number of elements in distilled dataset
D: Dimensionality of distilled dataset
α̃: step size
η̃: learning rate
x̃←init_distilled_data(M, D)
for t = 1 to T do
    x ~ p(X)
    for i = i to I
        θi ~ p(θ)
        for e = 1 to E do
            θi ←−η̃ ∇θi ℓ(x̃, θi)
        Li ← ℓ(x̃, θi)
   x̃ ← x̃−αΣi∇x̃ Li
   η̃ ←η̃−αΣi∇η̃ Li
   return x̃,η̃
```

FIG. 1

606
600
A
608
610
$C_0$
$C_z$
$N_0$
$N_i$
$N_j$
$N_n$
602
604
$E_0^i$
$E_1^i$
$E_2^i$ 700
702
704
Edge data collection
Start distillation
706
Enough data?
Yes
708
Distributed dataset distillation
Pre-train model
710
V
Deploy pre-trained models
712
Get val. metrics
714
Communicate val. metrics
716
718
Choose best model
720
Fine tune model
$E_i^z$
$M_1$
$V_1$ 804
$E_i^Z$
$S^i$
$S_t^i$ $S_{t-1}^i$ $S_{t-x}^i$
804
M
I
802

852
Deploy
$N_Z$
802
M
803
$\mathbb{S}$
802
M
Training
850

DISTRIBUTED IMAGE DISTILLATION FOR PRIVATE AND EFFICIENT EVENT PREDICTION IN LOGISTICS

FIELD OF THE INVENTION

Example embodiments of the present invention generally relate to management and use of datasets in connection with the training of machine learning models. More particularly, at least some embodiments of the invention relate to systems, hardware, software, computer-readable media, and methods for distilling datasets generated by edge nodes, while doing so in a way that is sensitive to privacy concerns of the entities whose data is distilled.

BACKGROUND

In some environments, a warehouse is one example, there is a need to be able to create and use machine learning models that may be used to help direct and control various operations in that environment so as to achieve one or more desired outcomes. Some domains may have, and/or generate, sensitive data that the entity that owns the domain wishes to keep private.

To continue with the warehouse example, a warehouse may contain sensitive information. Further, the warehouse may include equipment such as forklifts for example that may, among other things, act as edge devices that generate data. Depending upon the nature of the edge device, and the metrics that control data collection, massive amounts of data may be generated by a group of edge devices in an operating environment. For example, if each forklift of a group of forklifts included a camera to gather audio and video data relating to the operation of the forklift, large amounts of data could be generated by the camera in a relatively short period of time. Thus, a decision may be made that it would be better to keep the data at the edge devices, since they may lack the processing resources and bandwidth to offload these large amounts of data to some central entity for processing and other operations.

However, there may still be a need to centrally train models that leverage data coming from multiple warehouses, and multiple customers. Thus, retaining the data at the edge may be problematic in such cases. Another consideration is that there may be significant interest in keeping the compute cost at a near-edge site as low as possible, in order to reduce costs at the edge.

As these considerations illustrate, a two-fold problem may be presented with regard to the training and use of a machine learning model in some environments. The first problem is that of data volume, namely, how to efficiently store the massive amounts of data being generated in an edge computing environment, so that the data can be used for training a machine learning model. The second problem, which is related to the first, concerns management of the data in such a way as to be sensitive to privacy concerns. Specifically, if the edge data is distilled so as to improve the ease and efficiency with which it is used, the problem remains how to distill the data in such as way as to preserve privacy in resource-constrained near-edge nodes.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1 discloses an example algorithm for dataset distillation.

DETAILED DESCRIPTION OF SOME EXAMPLE EMBODIMENTS

Figure 2:
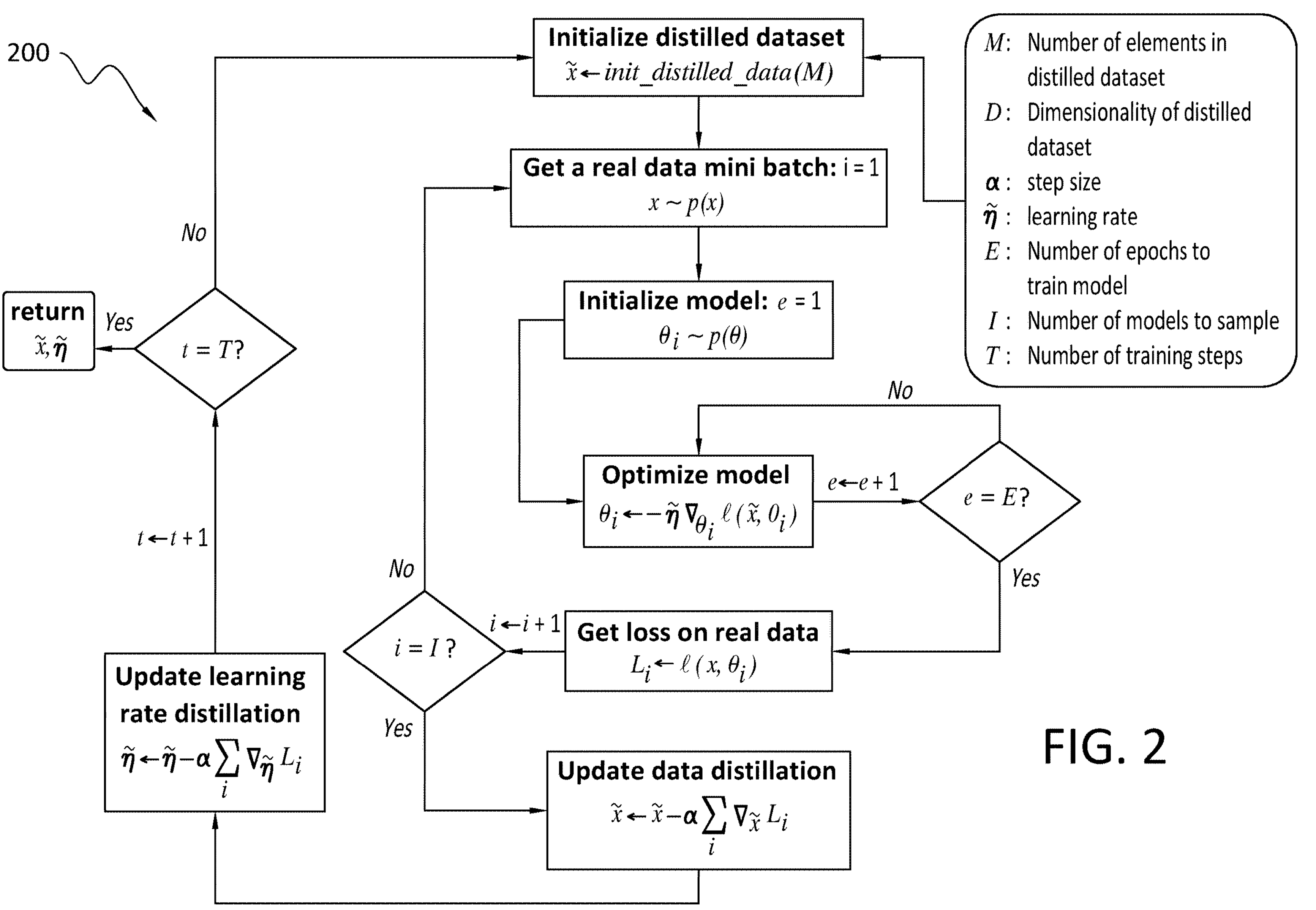
FIG. 2 is a flow diagram for the example dataset distillation algorithm of FIG. 1.

Example embodiments of the present invention generally relate to management and use of datasets in connection with the training of machine learning models. More particularly, at least some embodiments of the invention relate to systems, hardware, software, computer-readable media, and methods for distilling datasets generated by edge nodes, while doing so in a way that is sensitive to privacy concerns of the entities whose data is distilled. The distilled datasets may be used to train a machine learning model that can be used by all the entities that contributed data to a distilled dataset, while also preserving the privacy of the entities and their respective data.

In general, example embodiments of the invention may employ dataset distillation to compress information in the data, and then use the distilled dataset to efficiently pre-train machine learning models. Such embodiments may compress one or more data streams at an edge computing environment, such as data streams generated by edge nodes, in order to build a distilled version of the data coming from all near-edge nodes. Some particular embodiments are directed to an algorithm that is able to perform dataset distillation in a distributed manner, thus preserving privacy and being data-efficient at the same time. The distilled dataset may then be used to pre-train new machine learning models, such as an event detection model for example, that can then be fine-tuned at one or more near-edge nodes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may implement a data distillation process that effective compresses data belonging to various different entities or organizations, while also maintaining the privacy of the data. An embodiment may enable a cross-organization approach to machine learning model training in which different organizations, which may have competing interests, to contribute, in a privacy-preserving way, to the development of a model that may be used by all of the entities. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. EXAMPLE ENVIRONMENT AND CONTEXT FOR SOME EMBODIMENTS

Some example embodiments involve the creation and management of image data in a warehouse domain, which might contain sensitive information. In this context, camera feeds at edge devices such as forklifts may be generating massive amounts of data per forklift. In this regard, embodiments may aim to keep the compute cost at the near-edge as low as possible, in order to reduce cost at the edge. Thus, at least some embodiments are faced with a two-fold problem, namely, how to efficiently store massive amounts of data at the edge for training a model and, if distilling these data, how to do so in a privacy-preserving manner in resource-constrained near-edge nodes. Further details regarding these considerations are provided below.

A.1 Event Detection Via ML (Machine Learning) Models at the Edge

Event detection approaches leveraging sensor data at an edge computing environment are challenging. The data available at the edge node may not fully represent the domain for that edge node in the future. Hence, a typical approach is to gather training data from several edge nodes over time and perform centralized training. This approach may be adequate when the edge nodes do not have sufficient computational resources to perform model training.

However, in the cases in which edge nodes possess sufficient computational resources for training, this approach becomes inefficient—the data must be transferred to a central node for the model to be trained, and then sent back to the edge node. This makes updating the model difficult, for example. Furthermore, the generalization of the models is desirable so that the edge nodes may be able to detect events they have not experienced themselves.

A.2 Data Privacy Concerns

Example embodiments may take into consideration various privacy concerns and challenges. One of these is that the data collected by the edge nodes may include sensitive information in the data. One example of such sensitive information is images from camera feeds on an edge node, such as a forklift for example. Because these images may be of an interior of a warehouse, for example, of an organization, the organization may want to keep such images confidential.

Another of the concerns and challenges that may be taken into consideration by example embodiments is the need to be able leverage cross-organization data, but without requiring the storage of all of these data centrally. If cross-organization data could be leveraged for the training of an ML model, as it may be in example embodiments, many of the constraints noted herein might be minimized. For example, when events of interest are rare, they may not happen, and thus may not be sufficiently represented for training, in the edge nodes of a particular organization. As implemented in example embodiments, the leveraging of the learned experiences of other organizations in which such events did happen may lead to much broader generalization of an ML model. However, this approach, without more, may create data privacy concerns. The organizations may not want or allow their data to be shared with other organizations of a similar domain. In the example of a warehouse environment with edge nodes, such as forklifts, a traditional example would be of competing companies who operate similar warehouse structures. Thus, embodiments may not only provide for cross-organization leveraging of data, but doing so in a way that is sensitive to privacy concerns of the organizations whose data is involved.

A.3 Resource-Constrained Edge Nodes

The considerations above suggest the application of a distributed learning approach, that is, federated learning. However, conventional federated learning processes may require optimization to be done at the edge, while the present disclosure, with regard to some embodiments at least, assumes low, that is, inadequate, resources at the edge for performing optimization, data distillation, and other processes. Moreover, dataset distillation, as implemented by example embodiments, employs a different algorithm that requires its own adaptations. The problem then presents itself as how to adapt dataset distillation to be performed in a distributed, privacy-preserving way, in a coherent framework considering multiple edge nodes from possibly different organizations, whose respective interests may not be aligned with each other.

B. OVERVIEW

With the foregoing considerations in view, example embodiments may relate to the usage of sensor data collected, and processed, at the edge, that is in an edge computing environment, one non-limiting example of which is a warehouse environment. Example embodiments may implement an approach that can be used for management and automation of forklift operations, particularly leveraging machine learning models. Such approaches may be applied, for example, to safety and optimization checks. Note that while reference is made herein to logistics environments such as warehouses, such as for staging and storing materials, as an example of an environment in which embodiments may be implemented, the warehouse is presently only by way of illustration and for ease of discussion, and is not intended to limit the scope of the invention in any way. More generally, embodiments may be implemented in any environment that comprises one or more edge nodes, one or more near-edge nodes, and a central node.

Some example embodiments are particularly directed to the application of machine learning models for event detection. Event detection may be important for automating, optimizing and assessing an environment, with implications for operations as well as auditing. Example embodiments may consider edge environments with multiple edge nodes and near-edge infrastructure. Examples of events in a warehouse with forklifts may comprise dangerous cornering, excessive load, dock-entering or dock-exiting, collisions, or, more generally, any kinds of alarms raised by real-time monitoring systems. Detection of a dangerous event, such as dangerous cornering, may enable a deployed model, running at an edge device such as a forklift, to predict when a dangerous event is expected to occur. In the illustrative case of a warehouse, some example embodiments focus on addressing dangerous operations, such as by way of object/event detection approaches. Thus, example embodiments may be focused on models applied to object/event detection from respective camera feeds on different equipment, such as forklifts.

In the case of the warehouse example, embodiments may deal with image data in the warehouse domain, which might contain sensitive information. On top of that, the camera feeds at the forklifts will be generating massive amounts of data per forklift. In such contexts, data generated by the edge devices, forklift cameras in this example, might be better retained at the edge nodes, that is, at the forklift cameras. Further, example embodiments may operate to centrally train models that leverage data coming from multiple warehouses and multiple customers, where a customer may comprise a specific near-edge node. As well, embodiments may aim to keep the compute cost at the near-edge as low as possible, in order to reduce cost at the edge.

To these ends, and/or others, example embodiments may employ dataset distillation. In general, dataset distillation comprises techniques that implement the compression of information in the dataset in order to pre-train models much more efficiently. Embodiments may thus be directed to approaches that compress the data stream at the edge in order to build a distilled version of the data coming from all near-edge nodes. Embodiments may be directed to an algorithm that is able to perform dataset distillation in a distributed manner, thus preserving privacy and being data-efficient at the same time. The distilled dataset can then be used to pre-train new models that can then be fine-tuned at the near-edge node. Thus, embodiments may provide a framework that is able to distill data coming from different near-edge nodes in a privacy-preserving, distributed and efficient manner as applied to a logistic domain.

B. DATASET PROCESSES

B.1 Dataset Distillation

In general, dataset distillation includes techniques used to obtain a much smaller dataset that is still able to train an ML model to reasonable accuracy. Dataset distillation may seek to find an answer to the question—what would be a small, synthetic, dataset that when used to train a model, would yield low error? As this makes clear, it may not be enough to simply use a small sample of the dataset, since low error is also required. Similarly, compression of the full dataset may result in a smaller dataset, but that alone does not necessarily ensure a low error when the smaller dataset is used to train an ML model. With these considerations in mind, example embodiments may be directed to the creation of a 'sketch,' or distilled dataset, of the data in order to approximate a 'function,' or model.

In some embodiments, a distilled dataset may be obtained through a double optimization process, where an embodiment begins with a synthetic random dataset, such as white noise images for example, optimizes a model using a known, real, dataset, and then calculates a loss on the current synthetic dataset. Next, the embodiment may optimize with respect to the synthetic dataset on this calculated loss. Various models may be employed in this optimization process in order to obtain a distilled dataset that is robust to in-distribution changes to a family of models.

Note that much of the work done in dataset distillation is in the computer vision and neural network domains. In such domains, some versions of the technique are able to reduce the original dataset 100× fold while keeping a reasonably low error. In one example, the MNIST task achieves 94% test accuracy with fixed initialization and 79% with random initialization, and for the CIFAR10 task, achieves 54% test accuracy with fixed initialization and 36% on random initialization. See, T. Wang, J. Zhu, A. Torralba and A. Efros, "*Dataset distillation,*" *arXiv*, vol. preprint arXiv: 1811.10959, 2018 ("Wang").

Algorithm-1, denoted at 100 in FIG. 1, and the method 200 of FIG. 2, disclose an example algorithm for dataset distillation that may be employed in some example embodiments. This is the algorithm as disclosed in Wang, but it does not include distributed nodes, nor take data privacy into consideration. The Algorithm-1 100, and its main elements are discussed hereafter.

B.2 Dataset Distillation Breakdown

Figures 4, 5:
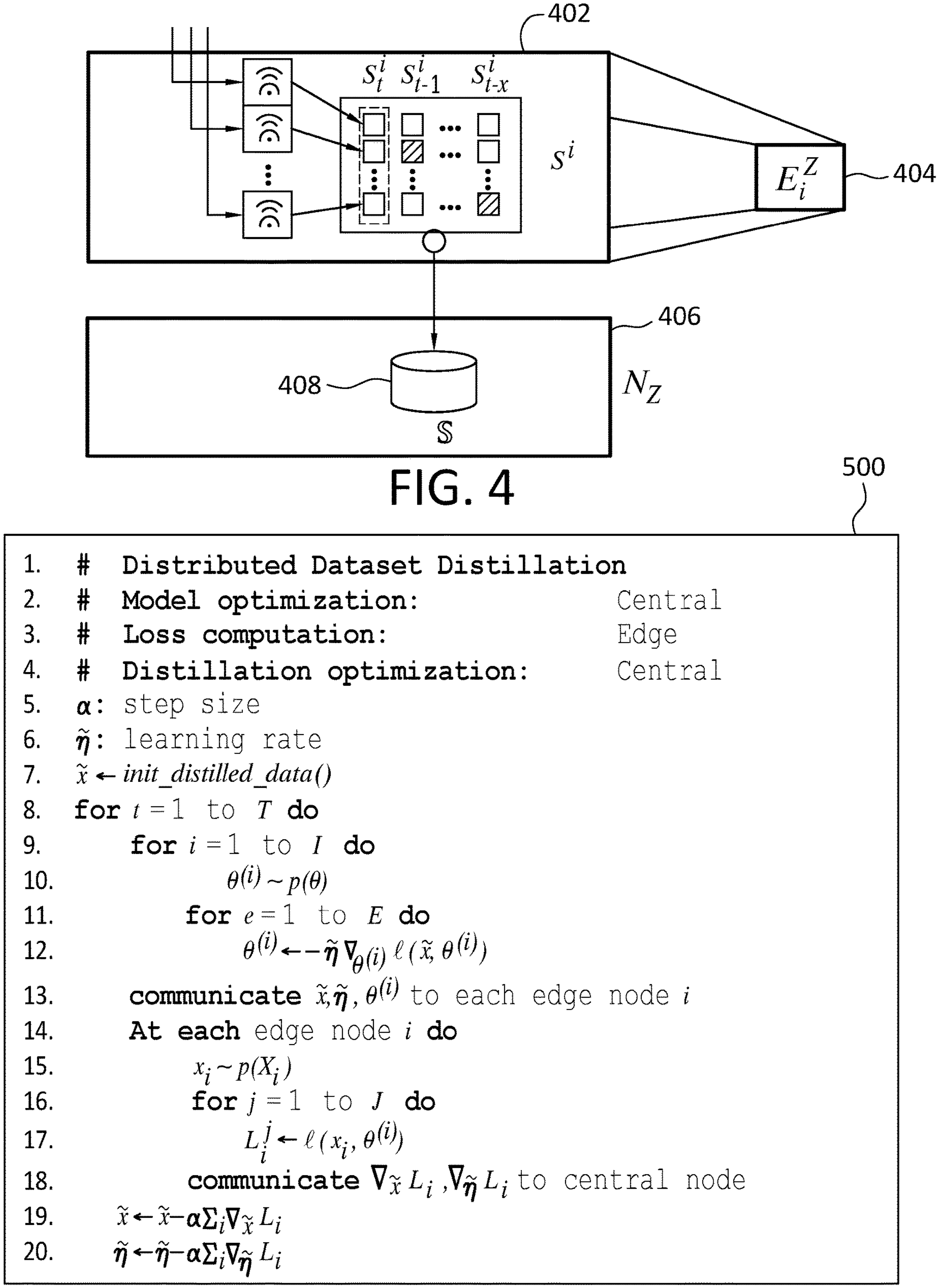
FIG. 4 discloses an example architecture for some embodiments.
FIG. 5 discloses an example algorithm for distributed dataset distillation.

Further example dataset distillation algorithms that may be employed in connection with embodiments of the invention are disclosed in U.S. patent application Ser. No. 17/451,608, entitled ADAPTABLE DATASET DISTILLATION FOR HETEROGENEOUS ENVIRONMENTS, filed 20 Oct. 2021 (the "'608 application"), and incorporated herein in its entirety by this reference. As noted in the '608 application, and disclosed in the method 200 of FIG. 2 ("Abstract view of Dataset Distillation"), an example dataset distillation algorithm 300, as shown in FIG. 4, may comprise three elements, namely: (1) model optimization 302, performed with respect to the current distilled data; (2) loss evaluation 304, performed with respect to the original data and optimized model; and, (3) gradient computation 306, performed with respect to the distilled data and learning rate. The operations 302, 304, and 306 may be performed at an edge node, or at a central node. In some embodiments, the operations 302, 306, and 306, may be performed in a closed loop for a given number of iterations T.

B.2.1 Model Optimization

In general, model optimization may be performed using the following relationship:

$$\theta_i \sim p(\theta)$$

$$\text{for } e = 1 \text{ to } E \text{ do}$$

$$\theta_i \leftarrow -\tilde{\eta}\nabla_{\theta_i}\ell(\tilde{x}, \theta_i)$$

This part of the dataset distillation process may involve optimizing a model for use with a set of distilled data. At first, the optimization of the model may begin with the use of random data, but in further calls, the optimization of the model may employ current optimized distilled data. Thus, the model may be optimized on the distilled data so that a determination can be made later as to how well the optimized model performs on real data.

The next stage of model optimization may comprise loss gradient optimization. This stage may require enough resources to sample a model using a random seed and an initialization function, and performing many steps of model optimization. Since model optimization may supersede model initialization in terms of computational resource requirements, this stage may only be able to be performed in nodes that have adequate local resources to optimize models.

This stage of the optimization process may require access to $\tilde{x}$, $\tilde{\eta}$, θ: the distilled data $\tilde{x}$; the distillation learning rate $\tilde{\eta}$; and a model θ. The distilled data $\tilde{x}$ changes at every overarching iteration t∈T and thus needs to be kept up to date. That is, if many nodes are each optimizing their own models, those nodes may need to refer to a same, or common, distilled dataset $\tilde{x}$. The model may be compactly represented by a random seed and an initialization function p(θ), since it is volatile in the sense that the model may only need to be created for this stage, after the completion of which, the model may be deleted. The result of the model optimization stage may be a model that has been optimized on the distilled data.

B.2.2 Loss Evaluation

A loss evaluation process of a dataset distillation may be performed using the following relationship: L(j)=l(xt, θ(j)). At this stage, an embodiment may evaluate the losses L(j) of a set of models θ(j) on the real training data xt. To do this, the embodiment may need access to three things, namely: (1) the loss function l(.); (2) the real training data xt; and (3) a set of optimized models θ(j) (note that the optimized models are those obtained by optimizing on the distilled data—the real training data may be stored at a central node, or at the edge, which may depend on the distillation method being run).

Note that reference is made to a set of optimized models because embodiments may be using edge nodes to optimize different models in parallel (so distillation is robust to initializations), or there may be a set of models being optimized centrally. Whether optimization is performed at the edge, or at a central location, may, again, depend on context restrictions that leads to a particular choice as between one or another distillation methods.

In terms of computation requirements needed to perform a loss evaluation process, embodiments may need to be able to perform a forward pass for the entire training data, for each model. This could be done on CPU-only nodes, but if the training data is high-dimensional and there are many samples, this might become prohibitive and thus there may be a need for accelerators such as GPUs to perform the loss evaluation. In any case, an end result of the loss evaluation process may be a set of loss values for each optimized model run on the entire set of training data.

B.2.3 Gradient Computation

A process for gradient computation of the loss value with respect to the distilled data ∇x and learning rate $\nabla\tilde{\eta}$ may be performed using the following relationship:

$$\nabla x(\Sigma jL(j));\nabla\tilde{\eta}(\Sigma jL(j))$$

Particularly, the computation of the gradient of the loss may require access to three pieces of information, namely: (1) the learning rate; (2) the distilled data; and (3) the loss function, and the set of loss values (obtained as indicated earlier herein). In terms of computation, the computation of the gradient may require the presence of accelerators, such as GPUs (graphics processing units), to perform the computation required for the gradients, especially if the distilled data is high-dimensional and/or has a large number of samples. The result of the gradient computation process may be the two gradients of the loss with respect to the distilled data ∇x and learning rate $\nabla\tilde{\eta}$.

B.3 Sensor Data Collection

Example embodiments may assume data collected at the near-edge from sensors deployed at each edge node individually. Each edge node (e.g. forklift in a warehouse) may comprise several sensors and collect, over time, multiple readings into a combined sensor stream. We assume at least some of these sensors will be cameras with constant feed. This is shown in FIG. 3 which discloses, in particular, a collection 402 of sensor readings Si from an edge node Ez 404, such as a forklift for example, is added to the near-edge Nz 406 database 408 of sensor readings $\mathbb{S}$.

Figure 3:
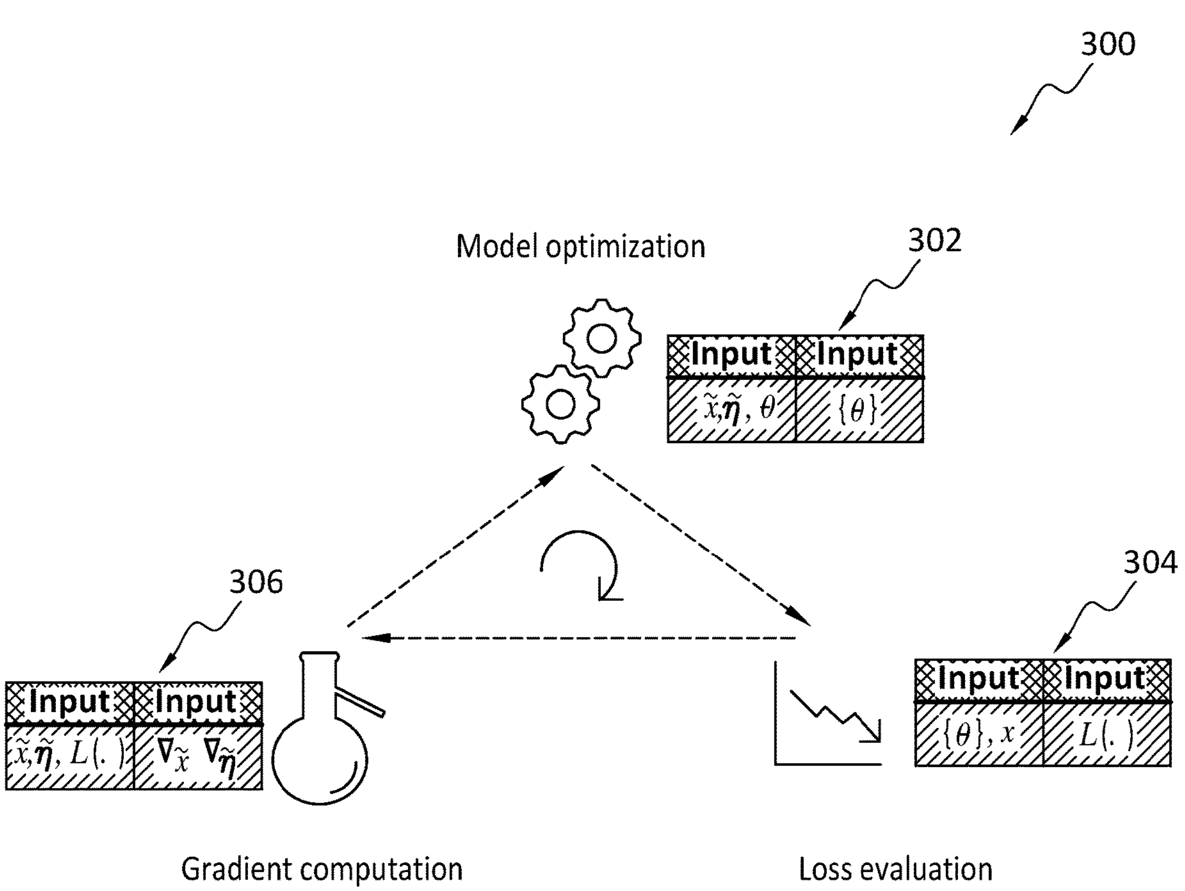
FIG. 3 discloses example phases of a dataset distillation process.

The example of FIG. 3 represents distinct sensors at edge node Ei whose readings are aggregated into a sensor stream Si of collections:

$$s_t^i, s_{t-1}^i, s_{t-2}^i, \ldots$$

As shown in FIG. 3, it may be assumed that a collection of sensor readings can be correlated in some way among themselves. For example, a sensor reading may comprise a GPS sensor reading indicating a location of an edge node, such as a forklift, in a warehouse, and another sensor reading may comprise a reading indicate how quickly the forklift is traveling.

At least some embodiments may assume the main sensor collection to be a camera feed with images taken directly from a camera setup at an edge node. A collection may be triggered periodically, or by a change in values—such as performing a data collection operation every time an acceleration or deceleration is observed, or a combination of both. The collection $s_t$ is the most recent data collection at time instant t. In this context, embodiments may assume at least x previous collections are stored within the edge node where the collections are being performed.

Note that some collections may not contain valid readings for certain sensors, as indicated by the shaded readings shown in FIG. 4, possibly because a sensor is not functioning properly, or because a properly functioning sensor was prevented from taking a valid reading for some reason, such as could occur if a sensor tried to obtain a GPS (global positioning system) location in an enclosed area of a warehouse that included metal and/or concrete walls that blocked the GPS signals. Example data collections may comprise valid positioning data that can be mapped into the coordinates of an environment such as, for example, GPS measurements in a warehouse. Additional information, or data, that may be collected includes inertial measurements of acceleration and deceleration—such as may be obtained from an inertial measurement unit (IMU) on a forklift, as well as bearing information, that is, direction of travel, and other types of rich movement tracking, examples of which, in the example warehouse context, include, but are not limited to, mast position, and load weight.

B.4 Private, Efficient and Distributed Dataset Distillation

This section is concerned with an example 'distributed dataset distillation' algorithm 500, shown in FIG. 5, that may be executable to perform distributed dataset distillation. In general, the algorithm 500 may operate in a way that is privacy preserving, and assumes low resource availability at the edge.

Example embodiments of this 'distributed dataset distillation' algorithm 500 are disclosed in the '608 application. The basic 'dataset distillation' algorithm 100 (see FIG. 1) may be broken down as discussed herein at B.2. That breakdown considered three aspects of the algorithm 100 disclosed in Wang, namely: (1) where the model is optimized; (2) where the loss is computed; and (3) where the distillation optimization is performed.

Thus, in some embodiments, the model may be optimized at the central node, the loss(es) computed at the edge node(s), and distillation optimization performed at the central node. That is, the only process performed at the edge may be the loss computation. This is because embodiments may assume relatively few resources at the edge, but also need to keep the data, collected at the edge, private. The loss computation may involve a single pass in a machine learning model and a loss computation per batch of the edge node data. This loss computation may be performed at the near-edge, which may be capable of performing such computation per each edge node.

C. EXAMPLE FRAMEWORK ACCORDING TO SOME EMBODIMENTS

Among other things, some example embodiments are directed to a framework and associated processes that may operate to compress a data stream at an edge location in order to enable the building of a distilled version of a dataset that comprises data coming from a group of near-edge nodes. At least some embodiments are concerned with a particular application of the algorithm disclosed in the '608 Application. By applying this application, embodiments may be able to perform dataset distillation in a distributed manner, thus preserving privacy and being data-efficient at the same time. The distilled dataset may then be used to pre-train new models that can then be fine-tuned at the near-edge node and then distributed to the edge nodes. In this way, the edge nodes in a group of nodes that may span multiple organizations are able to employ a model that has been developed using knowledge gleaned from the various organizations, which may result in a more robust model, but at the same time preserving the privacy of the data of the individual organizations.

That is, by exploiting a privacy-preserving distributed learning approach, example embodiments may allow for edge nodes of possibly different organizations (typically the individual business units, customers and partners of a company, but may even be competitors) to contribute towards better, that is, shared, event-detection models for use by all the edge nodes, all the while ensuring data privacy.

As well, a framework according to some example embodiments may also deal with possibly sensitive information contained in sensor streams such as, for example, camera images from inside a warehouse. Particularly, data privacy may be preserved since each near-edge location may be associated with a particular respective organization, and the data never leaves the near-edge locations. Thus, embodiments may provide, and use, a framework for the application and orchestration of an algorithm for distributed dataset distillation algorithm as applied to the cross-organization logistics domains, in a privacy preserving and efficient manner.

C.1 Aspects of an Example Operating Environment

C.1.1 Central Node and Near-Edge Nodes

Figures 6, 7:
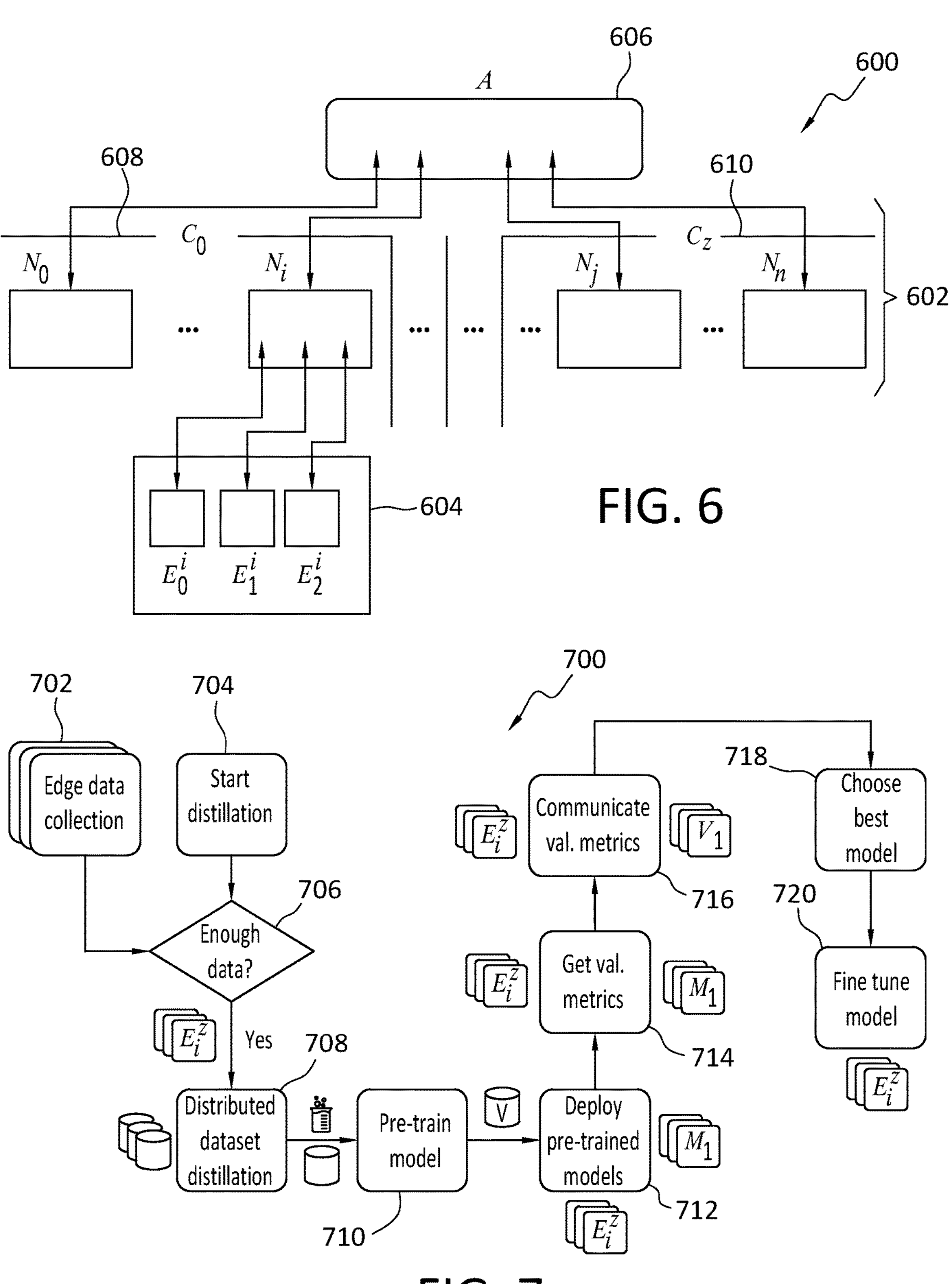
FIG. 6 discloses a cross-customer environment in which embodiments may be implemented.
FIG. 7 is a flow diagram for an example method according to some embodiments.

Example embodiments may employ an operating configuration 600 as disclosed in FIG. 6, which discloses a cross-customer environment, with edge-nodes associated to near-edge nodes, and near-edge nodes associated to a central node A. More particularly, a group of near-edge nodes 602 may be provided that each communicate with a respective set of edge nodes 604. Each of the near-edge nodes 602 may be owned and controlled by a different respective organization, and may only receive data collected by edge nodes 604 associated with a specific one of those organizations. Because, in some embodiments at least, data collected by an edge node 604 never leaves the near-edge node 602 with which that edge node 604 is associated, the data is effectively isolated from access by any other near-edge nodes 602. That is, the distillation of the data collections made by the edge nodes can be implemented, by a central node, using various parameters relating to the data, but distillation does not require use of the data itself. Finally, each of the near-edge nodes 602 may communicate with a central node 606.

In more detail, FIG. 6 shows how a central node A 606 communicates with several near-edge nodes $N_0, \ldots, N_n$ 602. The central node A 606 may represent a large-scale computational environment with appropriate permissions and connections to the near-edge nodes 602. In one example embodiment, the central node A 606 may comprise local infrastructure at a core company that may provide the orchestration, disclosed herein, as-a-service (aaS) and/or in partnership with other organizations.

C.1.2 Edge Nodes

In the example of FIG. 6, each near-edge node 602, or location, may be associated with several edge-nodes 604. In the Figure we highlight the node Ni and the associated edge nodes $$E_0^i, E_1^i,$$

and $$E_2^i,$$

collectively denoted at 604. Embodiments may consider that one or more of the edge nodes 604 may contain multiple different models for event detection, possibly different event(s) for each model, and/or that a single model may deal with several classes of events. However, solely for purposes of simplicity, and not limitation, the edge nodes 604 may be referred to herein as containing only a single model. In practical applications each near-edge node 602 may be associated to many edge nodes 604, possibly hundreds, thousands, or more—only a few are shown in FIG. 6, for ease of explanation. Some embodiments may assume that the edge nodes 604 comprise sufficient computational resources for the iterative training of a neural network, as typical in federated learning approaches.

C.1.3 Organizations

It is noted that in FIG. 6, various organizations, a delineation is made between the two example organizations $C_0$ 608 and $C_z$ 610, each of which may comprise, or are otherwise associated with, one or more respective near-edge nodes 602. Embodiments of the invention are not limited to any particular number of organizations and, in fact, may apply to any number 'n' of organizations, where 'n' is any positive integer equal to, or greater than, 1.

These organizations may represent, for example, two distinct companies or customers, or one or more core business units of a single company. For the description below of example methods according to some embodiments, it may be assumed that the near-edge nodes N0, . . . , Nn 602 communicate directly to the central node A 606 However, this may not necessarily be the case, and intermediate steps may be present in the communications between the central node 606 and the near-edge nodes 602, depending, for example, on characteristics of the edge environments at each organization.

For the formulation of some example embodiments, the details of that communication may be abstracted and may only refer to the concept of different organizations when discussing the data privacy concerns. For all else, the relevant concepts may be the central node 606, the near-edge nodes 602, and the edge nodes 604.

C.2 General Orchestration

With attention now to FIG. 7, an example method 700 according to some embodiments is disclosed. A framework according to some example embodiments of the invention may assume a constant collection of data 702 at one or more edge nodes. Periodically, the central node may signal the start of a distributed dataset distillation process. Each edge node that has a sufficient amount of data may signal back to its near-edge that it, the edge node, is capable of participating in this process of dataset distillation.

At this point, the central node may start 704 the distributed dataset distillation according to Algorithm-1 100 (see FIG. 1). This approach may preserve privacy while at the same time jointly constructing a single distilled dataset from all participant edge nodes. If there is an insufficient amount of edge nodes and/or data, as determined 706 by an expert in the area and pre-programmed in the central node, then the method 700 may not start. Also, if there is an insufficient number of near-edge nodes participating, the method 700 may not start.

After the distributed dataset distillation process 708 is complete, the central node may pre-train 710 a model using the distilled dataset resulting from performance of the dataset distillation process 709, and the pre-trained model, or models, may be deployed 712 to one or more edge nodes. That model may then be compared to other pre-trained models, resulting from previous distributed dataset distillation processes, and already stored at the central node. In some embodiments, this comparison may be performed by obtaining 714 metrics on validation sets across near-edge nodes, and the metrics may then be communicated to an expert 716 or other assessor. As a function of these metrics, which may be defined by an expert in the area, the best performing model may then be selected 718, which may then be deployed to the participant edge nodes. At these edge nodes, the models may be fine-tuned 720 to the newest data stream stored by the given edge node. That is, the distilled data served to pre-train a model that may then be fine-tuned 720 at the edge in order to close the gap to the particular data of each edge node, and thus achieve good performance.

C.3 Data Collection

Aspects of example data collection processes, explained elsewhere herein, may assume that each edge node has data coming from a multitude of sensors, not all of the sensor necessarily providing a constant stream of data. However, some embodiments may assume that there is periodic storage of these sensor data at the near-edge. The near-edge may operate to keep track of timestamps and data storage from each of its edge nodes, using database management systems and event-driven software for communicating at the edge.

At a given point in time then, the near-edge may contain a set of collections of data from each edge node, that the near-edge communicates with, for a given time period. The edge nodes may be constantly receiving sensor information and streaming and, if achieve maximum capacity is to be achieved at the near-edge for storage, embodiments may choose to always maintain the newest data for each edge node as well as a balanced storage for each edge node. This may be a useful approach since embodiments may assume low resource availability/capability at the edge nodes and further assume having to distill, at the central node, an immense amount of data coming from many different edge nodes.

Additionally, embodiments may assume collection of a small amount of data per edge node to serve as validation data. Since embodiments may operate with an unsupervised learning domain, collection of the validation data should be straightforward as a separate collection to be done. These validation data may serve to help select the best performing model after pre-training.

C.4 Model Pre-Training at the Central Node

This stage of model pre-training (see 710 in FIG. 7 for example) may start after the distributed dataset distillation process is complete since, at that juncture, there may be a single distilled central dataset built from respective data contributed by all participant edge nodes. A central model may then be trained using this recently distilled dataset. The model architectures to be trained may, in some instances, be pre-defined by an expert in the area. Example embodiments may further assume that central node has enough of the correct type of resources to pre-train the required model(s) on the distilled dataset. The model may be pre-trained on the most recently distilled data and embodiments may compare this pre-trained model with other models already stored at the central node, which may themselves been previously pre-trained on distilled data form previously executed distributed dataset distillation processes.

C.5 Models Edge Validation

In order to compare the various models, embodiments may assume that validation datasets are available at each near-edge node, which may be periodically gathered from edge nodes via the near-edge nodes. In example embodiments, it may be assumed that there is a straightforward comparison between pre-trained models on the same validation datasets, assuming as decider a function of metrics defined over the validation datasets. Each near-edge may calculate the validation metrics for each model, collect the validation metrics, and communicate the validation metrics back to the central node. The central node, upon receiving all validation metrics from all the near-edge nodes, may then compute an aggregation function, which may be defined by a subject matter expert for example, to arrive at a single number per model.

The best performing pre-trained model may be chosen as the one to be deployed to the participant edge nodes. Embodiments may, however, also assume this decision to be made based on other functions such as the time each model was trained. For instance, it may be desirable in some cases to avoid deploying old models to the edge nodes. Embodiments may also operate to join together different distilled datasets to form a single distilled dataset.

C.6 Model Fine-Tuning at the Near-Edge

Once the best performing model is chosen, the near-edge nodes may each fine-tune the received model on each of its respective edge node data in order to have one model per edge node. Embodiments may assume then that the near-edge nodes are capable of fine tuning the models, which is cheaper than performing a full-fledged training. It is noted that the training set for fine tuning may much smaller than it would be required to be if the model was to be trained from scratch. Embodiments may cross-fine tune the model on all of the near-edge node accumulated data, that is, from all edge nodes.

Figure 8:
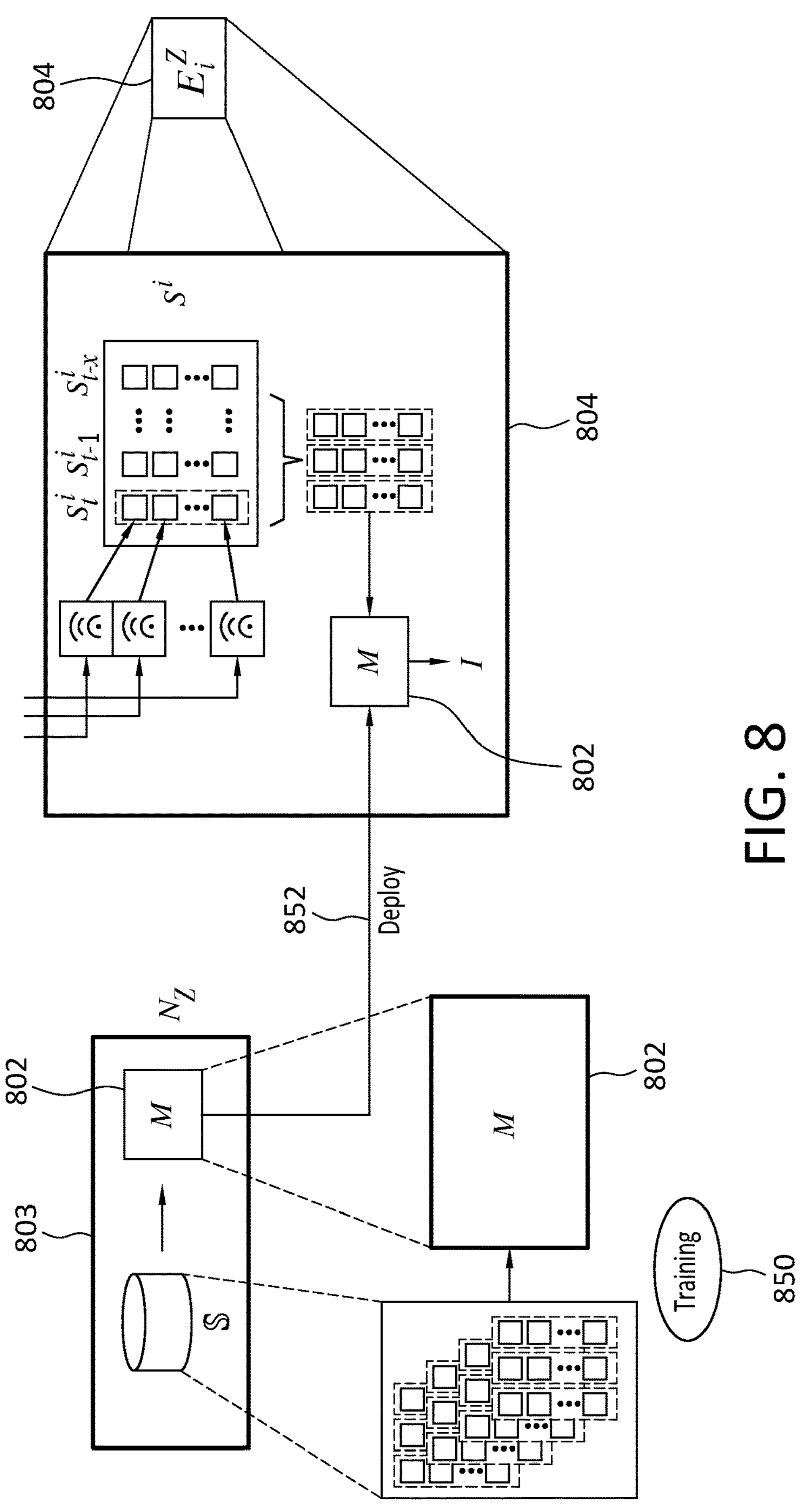
FIG. 8 discloses example processes for fine-tuning a machine learning model.

With reference now to FIG. 8, a process and architecture, collectively denoted at 800, are disclosed for fine-tuning a machine learning model M 802, which may reside at a near-edge node 803, and deploying the tuned ML model M 802 to one or more resource-constrained edge nodes 804. In FIG. 8, the inference I of the model M 802 may be used for decision making in very quick fashion, that is, with very little delay. After fine-tuning 850, shown as the training done at the near-edge node 803 in FIG. 8, the model M 802 may be deployed 852 to each edge node 804, and may function there as the current model in production.

D. FURTHER DISCUSSION

As disclosed herein, example embodiments may provide, and use, a framework that is able to distill data coming from different near-edge nodes in a privacy-preserving, distributed and efficient manner as applied to the logistic domain, assuming a number of different edge nodes associated with different respective near-edge nodes. These distilled data may then be used to choose the best performing model to be deployed to each edge node by fine-tuning the model at the near-edge.

E. EXAMPLE METHODS

It is noted with respect to the disclosed methods, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. FURTHER EXAMPLE EMBODIMENTS

Following are some further example embodiments of the invention. These are presented only by way of example and are not intended to limit the scope of the invention in any way.

Embodiment 1. A method, comprising: in an environment that includes a first near-edge node and a second near-edge node, each of which is operable to communicate with a respective set of edge nodes and with a central node: instantiating, by the central node, a dataset distillation process, wherein the dataset includes data collected by the edge nodes, wherein the data remains at the near-edge nodes and is not accessed by the central node; performing the dataset distillation process to create a distilled dataset; pre-training a machine learning model using the distilled dataset; comparing the pre-trained machine learning model to one or more other pre-trained machine learning models; and deploying, to the edge nodes, the pre-trained learning model that has been determined, based on the comparing, to provide the best performance as among the pre-trained machine learning models that have been compared.

Embodiment 2. The method as recited in embodiment 1, wherein each edge node comprises a respective camera operable to gather data about the environment.

Embodiment 3. The method as recited in embodiment 2, wherein each camera is associated with a respective piece of mobile equipment.

Embodiment 4. The method as recited in embodiment 3, wherein, at each edge node, the camera and the machine learning model deployed at that node cooperate to predict and/or detect occurrence of an event involving the respective piece of mobile equipment.

Embodiment 5. The method as recited in any of embodiments 1-4, wherein the data comprise video data of the environment.

Embodiment 6. The method as recited in any of embodiments 1-5, wherein each near-edge node is associated with a different respective organization.

Embodiment 7. The method as recited in any of embodiments 1-6, wherein the data collected by the edge nodes resides at the near-edge nodes when the data distillation process is instantiated.

Embodiment 8. The method as recited in any of embodiments 1-7, wherein determining the pre-trained learning model that has the best performance comprises: calculating, by each of the near-edge nodes, respective validation metrics for each of the pre-trained machine learning models; and computing, by the central node based on the validation metrics, an aggregation function to determine a respective number of each of the pre-trained machine learning models, wherein the pre-trained machine learning model with the best performance has the highest number.

Embodiment 9. The method as recited in any of embodiments 1-8, wherein the operations further comprising fine-tuning, at one of the near-edge nodes, the best performing machine learning model.

Embodiment 10. The method as recited in embodiment 9, wherein, after the fine-tuning, the best performing machine learning model is deployed by the near-edge node to the edge nodes with which that near-edge node is operable to communicate.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
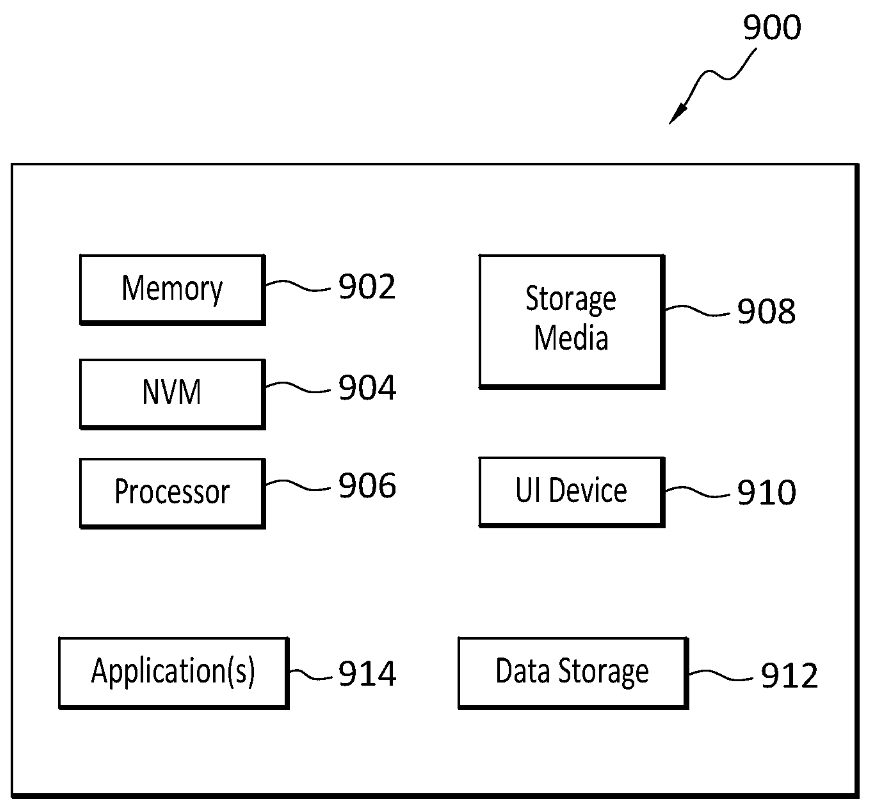
FIG. 9 discloses an example computing entity operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI (user interface) device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for distributed image distillation for private and efficient event prediction in an environment, comprising:

in an environment that includes a first near-edge node and a second near-edge node, each of which is operable to communicate with a respective set of edge nodes and with a central node, and each of the edge nodes comprises a respective camera operable to gather data about the environment:

instantiating, by the central node, a distributed dataset distillation process, wherein the dataset includes image data collected by the cameras of the edge nodes, wherein each near-edge node maintains image data collected by its respective edge nodes;

performing the dataset distillation process to create a distilled dataset that is based on the image data, wherein the distilled dataset aggregates information derived from image data maintained at multiple near-edge nodes;

pre-training an event detection machine learning (ML) model using the distilled dataset, at the central node and prior to deployment of the event detection ML model to any edge node, and the event detection ML model enables one of the edge nodes to use a feed from the camera at that edge node to detect an event occurring in the environment, including detection of an event represented in image data contributed by other near-edge nodes;

comparing the event detection ML model to one or more other pre-trained event detection ML models that have been trained respective distilled datasets generated by prior executions of the distributed dataset distillation process; and deploying, to the edge nodes, the event detection ML model that has been determined, based on the comparing, to provide the best performance as among the event detection ML models that have been compared.

2. The method as recited in claim 1, wherein each camera is associated with a respective piece of mobile equipment, and the image data includes data regarding operation of the mobile equipment in the environment.

3. The method as recited in claim 2, wherein, at each edge node, the camera and the event detection ML model deployed at that edge node cooperate to predict and/or detect occurrence, in the environment, of an event involving the respective piece of mobile equipment.

4. The method as recited in claim 1, wherein the image data comprise video data of the environment.

5. The method as recited in claim 3, wherein prediction and/or detection of the occurrence of the event involving the respective piece of mobile equipment is performed in real time while the piece of mobile equipment is operating.

6. The method as recited in claim 1, wherein the image data collected by the edge nodes resides at the near-edge nodes when the data distillation process is instantiated.

7. The method as recited in claim 1, wherein determining the pre-trained learning model that has the best performance comprises:

calculating, by each of the near-edge nodes, respective validation metrics for each of the pre-trained machine learning models; and computing, by the central node based on the validation metrics, an aggregation function to determine a respective number of each of the pre-trained machine learning models, wherein the pre-trained machine learning model with the best performance has the highest number.

8. The method as recited in claim 1, further comprising fine-tuning, at one of the near-edge nodes, the best performing machine learning model.

9. The method as recited in claim 8, wherein, after the fine-tuning, the best performing machine learning model is deployed by the near-edge node to the edge nodes with which that near-edge node is operable to communicate.

10. A non-transitory storage medium having stored therein instructions that are executable by one or more hardware processors to perform a method for distributed image distillation for private and efficient event prediction in an environment, that includes operations comprising:

in an environment that includes a first near-edge node and a second near-edge node, each of which is operable to communicate with a respective set of edge nodes and with a central node, and each of the edge nodes comprises a respective camera operable to gather data about the environment:

instantiating, by the central node, a distributed dataset distillation process, wherein the dataset includes image data collected by the cameras of the edge nodes, wherein each near-edge node maintains image data collected by its respective edge nodes;

performing the dataset distillation process to create a distilled dataset that is based on the image data, wherein the distilled dataset aggregates information derived from image data maintained at multiple near-edge nodes;

pre-training an event detection machine learning (ML) model using the distilled dataset, at the central node and prior to deployment of the event detection ML model to any edge node, and the event detection ML model enables one of the edge nodes to use a feed from the camera at that edge node to detect an event occurring in the environment, including detection of an event represented in image data contributed by other near-edge nodes;

comparing the event detection ML model to one or more other pre-trained event detection ML models that have been trained respective distilled datasets generated by prior executions of the distributed dataset distillation process; and deploying, to the edge nodes, the event detection ML model that has been determined, based on the comparing, to provide the best performance as among the event detection ML models that have been compared.

11. The non-transitory storage medium as recited in claim 10, wherein each camera is associated with a respective piece of mobile equipment, and the image data includes data regarding operation of the mobile equipment in the environment.

12. The non-transitory storage medium as recited in claim 11, wherein, at each edge node, the camera and the event detection ML model deployed at that edge node cooperate to predict and/or detect occurrence, in the environment, of an event involving the respective piece of mobile equipment.

13. The non-transitory storage medium as recited in claim 10, wherein the image data comprise video data of the environment.

14. The non-transitory storage medium as recited in claim 12, wherein prediction and/or detection of the occurrence of the event involving the respective piece of mobile equipment is performed in real time while the piece of mobile equipment is operating.

15. The non-transitory storage medium as recited in claim 10, wherein the image data collected by the edge nodes resides at the near-edge nodes when the data distillation process is instantiated.

16. The non-transitory storage medium as recited in claim 10, wherein determining the pre-trained learning model that has the best performance comprises:

calculating, by each of the near-edge nodes, respective validation metrics for each of the pre-trained machine learning models; and computing, by the central node based on the validation metrics, an aggregation function to determine a respective number of each of the pre-trained machine learning models, wherein the pre-trained machine learning model with the best performance has the highest number.

17. The non-transitory storage medium as recited in claim 10, wherein the operations further comprise fine-tuning, at one of the near-edge nodes, the best performing machine learning model.

18. The non-transitory storage medium as recited in claim 17, wherein, after the fine-tuning, the best performing machine learning model is deployed by the near-edge node to the edge nodes with which that near-edge node is operable to communicate.

* * * * *